July 28, 1942. W. B. CLARY ET AL 2,290,942
METHOD AND APPARATUS FOR ELIMINATING UNDESIRED VEGETATION
Filed May 11, 1939
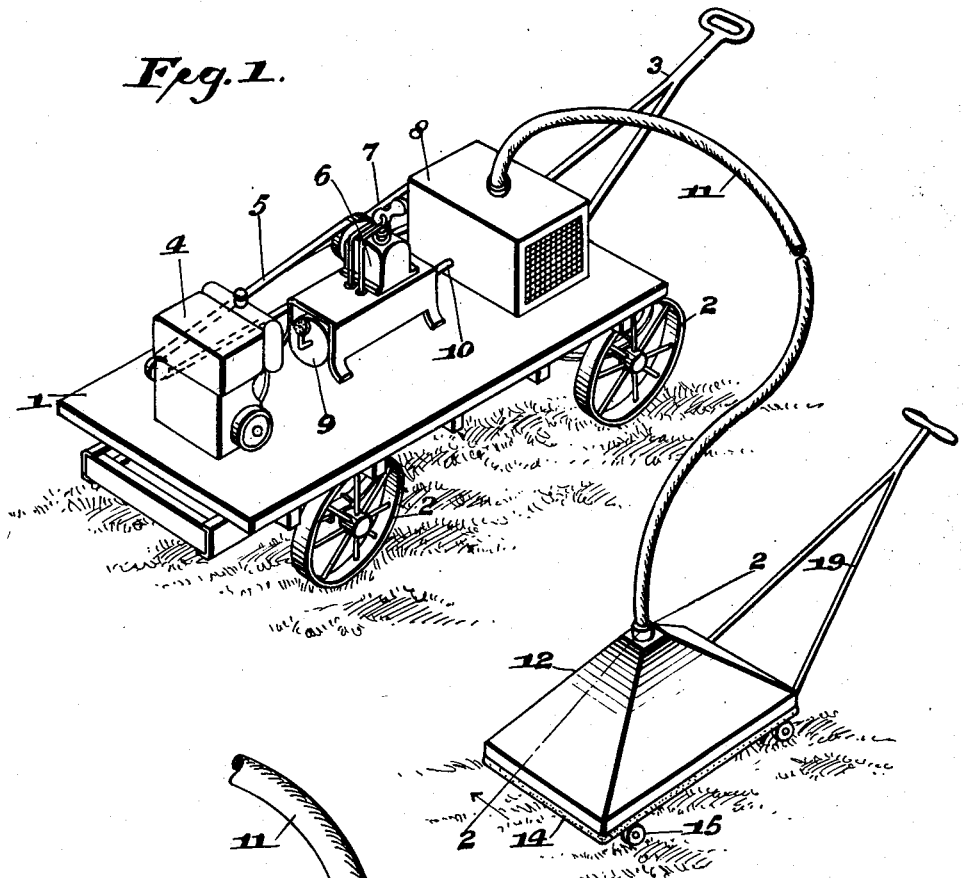
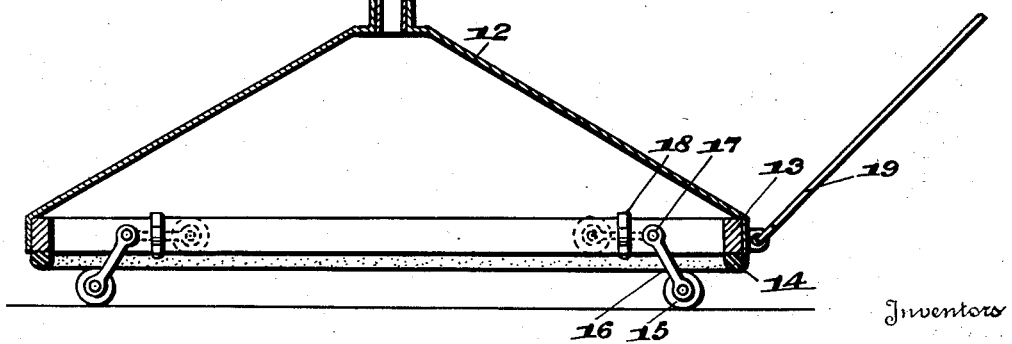
Inventors
William B. Clary
John J. Dolan Patented July 28, 1942

2,290,942

UNITED STATES PATENT OFFICE 2,290,942

METHOD AND APPARATUS FOR ELIMINATING UNDESIRED VEGETATION

William B. Clary and John J. Dolan, Coshocton, Ohio

Application May 11, 1939, Serial No. 273,142

2 Claims. (Cl. 47—1)

This invention relates generally to horticulture and to arts analogous thereto, its specific purpose being to maintain the grass on golf courses in as nearly a perfect condition as it is possible to do so. In the latter respect it is proposed to eliminate undesirable annual vegetative growths from putting greens and fairways, and to extend the principle of the invention to the maintenance of ornamental lawns and in any other analogous situation where the foregoing growths are objectionable.

Currently used methods of treating golf greens for the maintenance of the grass in the desired attractive condition involve much manual labor, because in many instances undesired growths such as crab-grass and the like, have to be dug up by the roots. These methods also include the use of chemicals for clearing out the undesired growths and the cost of these runs into large amounts in the course of even a single season.

It has been discovered that the foregoing undesired growths can be controlled by the artificial reproduction of the natural formation of frost. The latter has been observed to clear out the undesired vegetation, leaving the true grass in a fine state, and the invention comprises a method of duplicating the natural phenomenon in a manner which is presently brought out. With the above preamble in mind the objects of the invention are as follows:

First, to provide a method of controlling the growth of vegetation by the localized application of a cooling medium, said control either promoting said growth or stopping it in accordance with the intensity of said medium.

Second, to provide a method of the foregoing characteristics which produces the results named by the application of said method to the surface vegetation.

Third, to provide a method of making and applying artificial frost to localized vegetable areas thus to freeze and kill unwanted portions of the vegetation as well as such other undesired elements as fungus growths, earthworms, etc.

Fourth, to provide a method of manufacturing artificial frost and to make it possible to apply said method virtually anywhere within a desired radius, in other words, to provide for the mobile application of the frost in such places as plots of grass.

Fifth, to provide a specific method of treating golf greens for the purpose of promoting the growth of the desirable grass by the direct application of a cooling medium to freeze out the crab grass, fungi, etc.

Other objects and advantages will appear in the following specification, reference being had to the accompanying drawing, in which:

Figure 1 is a perspective view of a typical apparatus for carrying out the method.

Figure 2 is a cross section taken on the line 2—2 of Fig. 1, illustrating the details of one type of hood for localizing the application of a cooling medium.

It has been pointed out in the foregoing statements of the general objects of the invention, that the latter is directed more particularly to the maintenance of golf greens. In the latter respect, experience taught that early frosts in the fall of the year serve to clear the common enemies of true grass. Such enemies are crab grass, a fairly large variety of plants such as dandelions, a variety of fungus growths, as well as earthworms. This observation has shown that immediately after the first frosts the true grass will show an immediate improvement often appearing equal, if not better than grass in the spring. The brown spots which often show in the grass disappear after said frosts because of the clearing out of the fungi. The invention, as has been suggested already, comprises an imitation of the natural phenomenon of frost. Being such, it consists of a simple, yet effective method, the apparatus for carrying out the latter comprising the following structure:

In Fig. 1 use is made of a truck 1 which includes the wheels 2 and a tongue 3 by which the vehicle and the mechanism on it can be pulled around from place to place. Said mechanism comprises a motor 4 which may comprise either a gasoline engine, as suggested in the drawing, or an electric motor, if facilities are available for conducting electric current to the apparatus.

Said motor has a belt drive 5 for an air compressor 6, the latter being belted at 7 to the operating mechanism of a refrigerator unit 8 of any known type. Thus it will be seen that the motor 4 operates the compressor 6 and refrigerator unit 8 simultaneously.

The obvious purpose of the unit 8 is to cool the air compressed by the compressor 6, the latter discharging the compressed air into a tank 9 whence it is piped at 10 to the unit 8 and eventually conducted to the tube 11 which is long enough to reach over a reasonably large radius around the compressor-cooler vehicle.

The volume of air adapted to be put under compression and the degrees to which it is cooled, are factors which are not necessarily set out exactly. It is necessary, however, to point out that the cooling of the air is carried at least to 32° F. In many instances the cooling will be to a lower degree, the usual range being in the neighborhood of 10 to 20° F.

Although the range of cooling is subject to a fairly wide variation of temperatures, yet it should be clear that the air conducted by the tube 11 must be cold enough to freeze the surface moisture on the grass, and thus simulate a natural deposit of frost. The frost will not injure the true grass, but it will clear the crab grass and a large variety of fungi. The cooled air is conducted to a hood 12 which constitutes the free terminal of the tube 11. This hood is usually made of steel, although the material of its construction does not concern the invention.

It is framed at 13 (Fig. 2) to provide an adequate base for the pyramidal portion of the hood, the bottom portion of the frame being edged with rubber 14 or the like to provide an effective seal when the hood is let down. Said hood has rollers 15 (or wheels) which are carried by swingable arms 16. These arms are pivoted at 17 to the frame, and they are adapted to be lowered either to the full line positions (Fig. 2) or raised to the dotted line positions respectively for transportation and sealing purposes.

When in the latter positions the arms are held by suitable clips 18, and when the arms are thus held then the edge 14 will obviously be in contact with the ground, thereby making a more or less tight enclosure to which the cooled air will be confined. The freezing air will be pumped in long enough to insure the formation of the frost. After the work has been done the arms 16 will be lowered and the hood 12 drawn to a fresh spot by means of the tongue 19.

Thus it will be understood that the method comprises the steps of compressing a volume of air, leading it through a refrigerator unit for the purpose of reducing its temperature to freezing, and then directing the cooled air to a point of direct physical application to the vegetation as in Figs. 1 and 2.

It will be noted that emphasis has been laid on the method phase of the invention. This is of primary importance because the steps enumerated above are capable of being performed by apparatus constructed otherwise than herein specifically illustrated. Said apparatus, however, is also of importance because it contitutes necessary equipment for the effective carrying out of the method steps. For the latter reason the typical apparatus is herein claimed as well as the method, and in conclusion it is further desired to point out that air is named hereinbefore chiefly because it is the most freely accessible refrigerable medium, although it is easily conceivable that a fluid medium other than air might be employed.

We claim:

1. Apparatus for treating vegetation comprising a movable vehicle, air compressor means on said vehicle, refrigerator means by which the air is treated to reduce it to a freezing temperature, a tube by which the freezing air is conducted off to a point of application, and means constituting the free terminal of said tube receiving the discharge of freezing air, said means having means for making a seal around a prescribed area of growing vegetation, thus to subject the latter to the freezing air.

2. The method of removing undesirable vegetation from selected grass plots which comprises conducting through a confined space, a fluid chilled to a temperature below 32° F. to a point above the plot to be treated, expanding the chilled fluid over a portion of the plot while concentrating the expanding fluid in sealed confinement containing atmospheric air over said portion until the undesirable vegetation has been destroyed then concentrating additional chilled and expanded fluid in sealed confinement on other portions of the plot containing undesirable vegetation.

WILLIAM B. CLARY.
JOHN J. DOLAN.